May 28, 1946.　　　M. H. THOMPSON　　　2,401,029
CIRCLE INDICATOR
Filed April 22, 1944　　　2 Sheets-Sheet 1

MALCOLM H. THOMPSON
INVENTOR.

BY

ATTORNEY

May 28, 1946.　　　M. H. THOMPSON　　　2,401,029
CIRCLE INDICATOR
Filed April 22, 1944　　　2 Sheets-Sheet 2

MALCOLM H. THOMPSON
INVENTOR.
BY
ATTORNEY

Patented May 28, 1946

2,401,029

UNITED STATES PATENT OFFICE 2,401,029

CIRCLE INDICATOR

Malcolm H. Thompson, Dallas, Tex.

Application April 22, 1944, Serial No. 532,305

6 Claims. (Cl. 116—129)

This invention relates to devices for facilitating circle reading of mathematical instruments and more particularly to an instrument for indicating the parts of a graduated circle.

The principal object of the invention is to provide a direction indicator adapted for use on or in connection with transits, levels, alidades, sextants, compasses, dividing machines and other instruments in which the graduated arcs and circles are necessarily restricted as to size, therefore making reading difficult and even impossible in some cases except with the aid of a microscope which is standard equipment on most types of transits used by surveyors and engineers. Inaccuracies in calculation as a result of erroneous readings under trying conditions, such as may be experienced by technicians working in bright sunlight, high winds or other adverse circumstances, may become serious and to minimize the time and labor in computation and to obviate or reduce materially the likelihood of error, the present invention provides a rotatable circle with fixed graduations, a pointer adapted to remain in a predetermined position by virtue of the gear ratio of a system of gears indicating in conjunction with such graduations the degrees of movement of the circle and a second pointer adapted and arranged, through said system of gears, to travel over a greater number of graduations of the circle, thereby enabling the operator to read without magnification, fractional parts of a division of the graduated circle.

Another object of the invention lies in the provision of a novel form of mechanism by which motion differentials between the pointers and the graduated element are effected by simple manipulation of the latter.

With the foregoing objects as paramount, the invention has further reference to certain features of accomplishment which will become apparent as the description proceeds, taken in connection with the accompanying drawings wherein.

Figure 1:
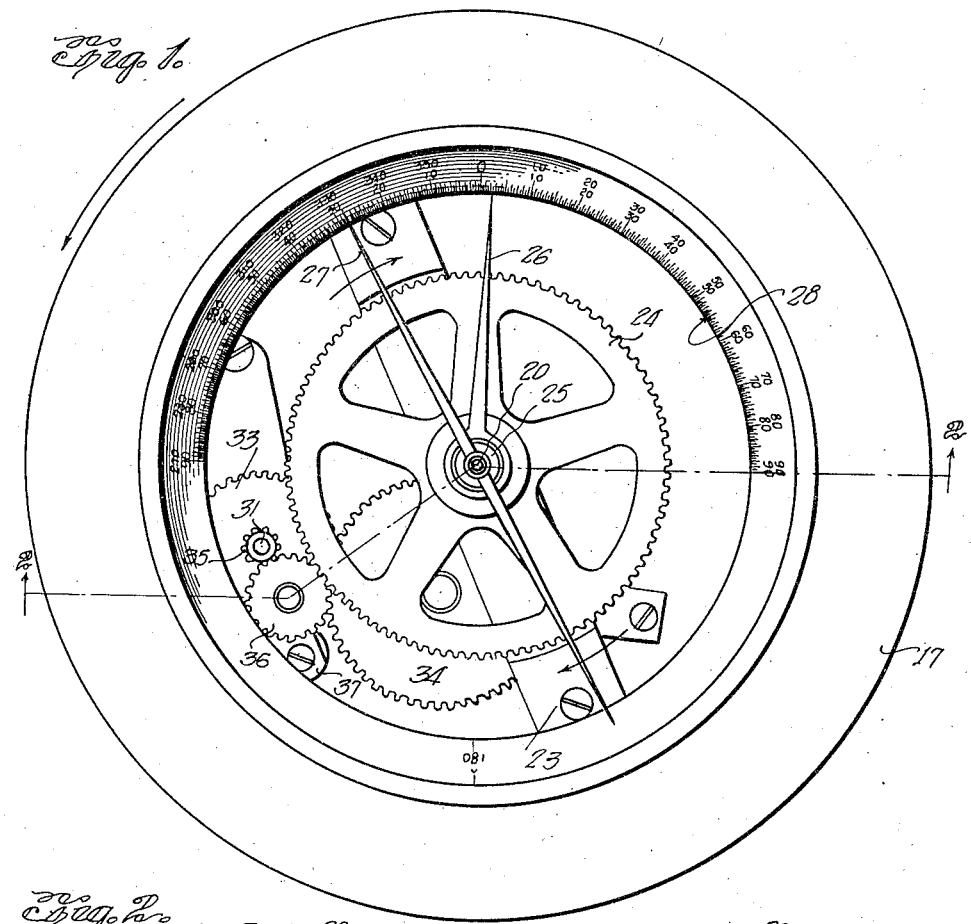
Figure 1 is a plan view of a direction indicator constructed according to the present invention.
Figure 2:
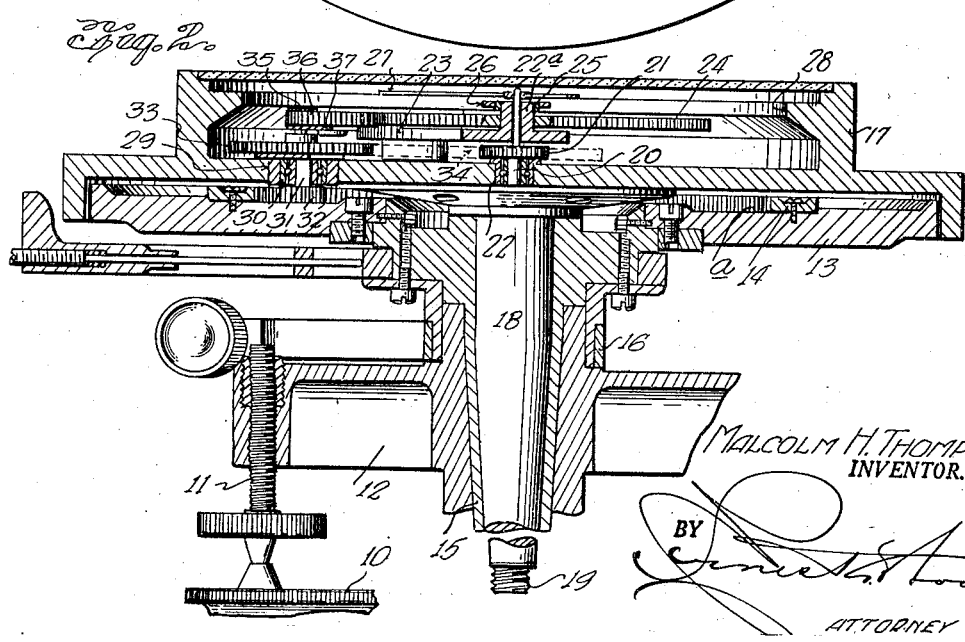
Figure 2 is an elevational view in cross-section, taken on line 2—2 on Figure 1.

Continuing with a more detailed description of the drawings, reference is primarily made to Figures 1 and 2 wherein numeral 10 denotes fragmentarily the leveling plate of a conventional transit shown as one medium of adaptation of the invention and on which plate bears the leveling screws 11, the latter being mounted in the supporting frame 12.

Generally speaking, the circles used in connection with instruments such as the transit are constructed from silver with graduations engraved thereon. Associated with the circle graduations are verniers with corresponding graduations reading in seconds or minutes, depending upon the requirements of the instruments. For example, a circle may be divided into 10 minute spaces, 59 parts on the circle being equal to 60 parts on the vernier, which will give a reading to 10 seconds. Obviously, such division is most difficult to read and is fatiguing to the eyes, hence a magnifying glass is provided as standard equipment on these instruments.

Figure 3:
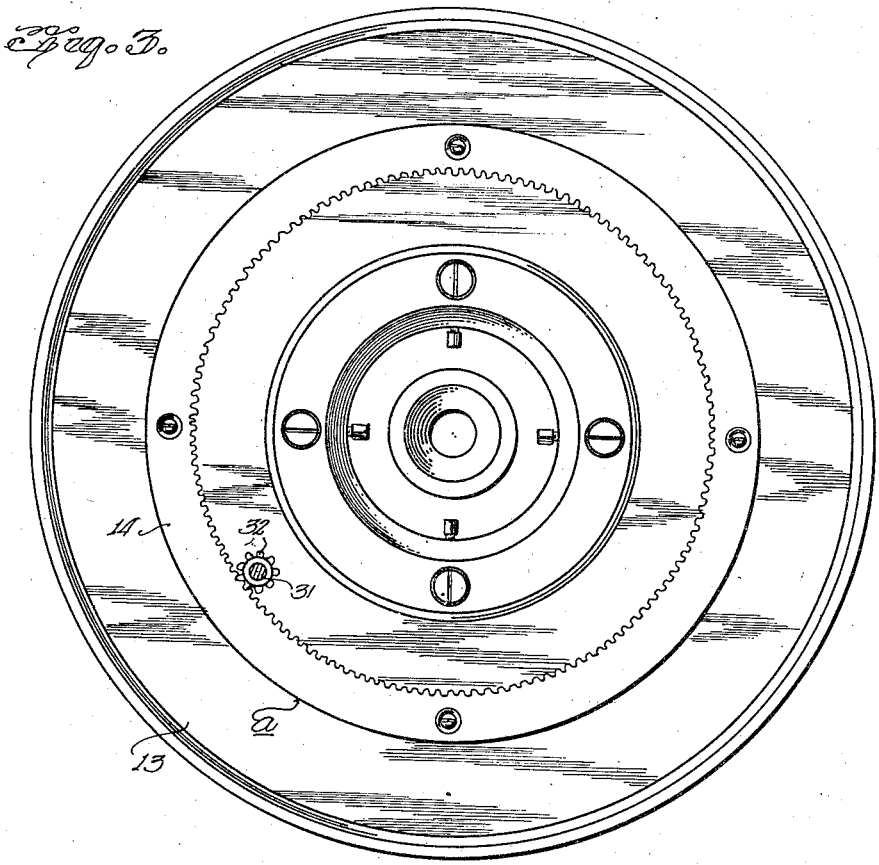
Figure 3 is a plan view of the supporting platform for the graduated element or turntable from which the latter has been removed.
Figure 4:
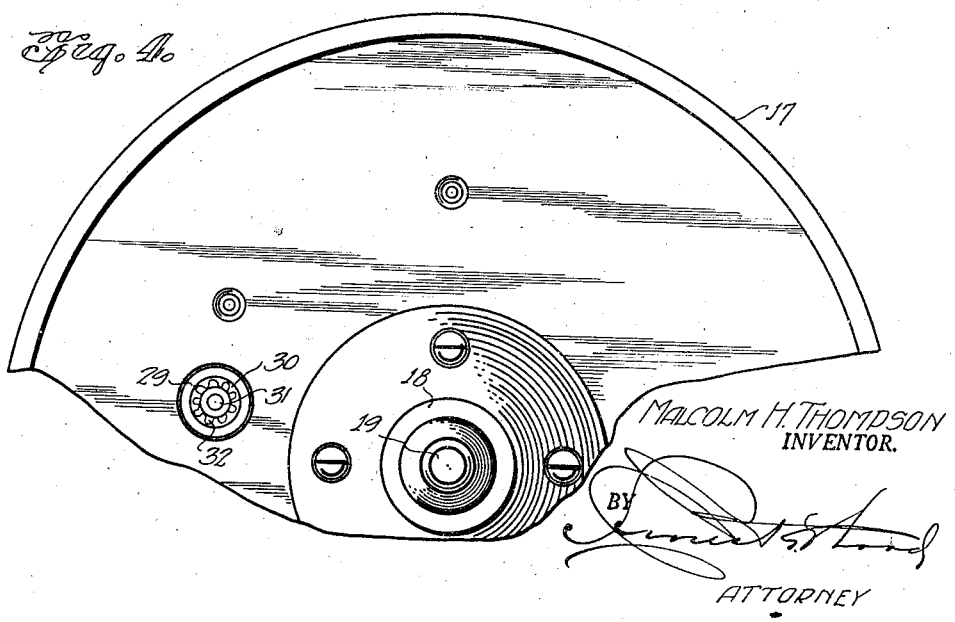
Figure 4 is a fragmentary bottom plan view of the turntable.

The present invention obviates the need for reading magnifiers and to this end, the supporting platform 13, shown in the plan view in Figure 3 is provided with a counter-sunk portion at $a$, in which is disposed an annular, internally toothed ring 14. The platform 13 may, itself, be held stationary or released for rotation on its individual hollow spindle 15 by manipulation of screws retaining the clamp 16 (Fig. 2). However, operation of the invention is usually effected while the platform is stationary.

Mounted for rotation on the platform 13 is a turntable 17, arranged in as perfect balance as is possible to attain, on the spindle 18, which is rotatably disposed in the hollow spindle 15 of the platform 13. The spindle 18 is threaded at its lower end at 19 (Fig. 2) to receive a nut, which latter holds the parts of the instrument in assembled relationship.

Mounted in a recess in the floor of the turntable 17 is a pintle 20, carrying a pinion 21. The pintle is embraced by a bearing 22 to reduce friction. The pintle rises through a centrally apertured boss 22a formed on a cross-member 23 which latter supports a large gear 24. This gear is provided with an integral flange 25 upon which is mounted a pilot pointer 26. Hence the pointer remains in a certain position due to the gear ratio between the ring drive gear 14 and gear 24. A complementary pointer 27 is mounted upon the extreme upper end of the pintle 20.

It will be observed in Figure 1 that the pilot pointer 26 and complementary pointer 27 are each in a position to denote the graduations on the circle 28 and it will become apparent presently how the ratio differential between these pointers is effected to facilitate reading of the graduations in computation.

The turntable 17 is apertured at a point spaced from its rotating axis to receive a ferrule 29 which latter, in turn, retains a friction-less bearing 30. A shaft 31 is arranged in this bearing and carries a driving pinion 32. This pinion enmeshes the teeth of the gear ring 14. The shaft 31 extends above the floor of the turntable 17 and carries a larger gear 33, whose teeth enmesh those of an intermediate and still larger gear 34. This latter gear effects connection between the driving gear and the pinion 21 which actuates the supplementary pointer. It may be here pointed out however, that any desired change in gear ratio to vary the ratio of displacement between the two pointers 26 and 27 may require elimination of or change in the diameter of the intermediate gear 34.

Mounted also on the shaft 31 above the gear 33 is a small pinion 35 which meshes with a gear 36, independently mounted on a bracket 37, supported from the floor of the turntable 17.

It is obvious from the foregoing that by rotating the turntable 17, the driving pinion 32, due to its engagement with the gear ring 14, will be caused to rotate, imparting rotation to gear 33 and pinion 35, the former causing the pointer 27 to move, through the intermediate gear 34 and pinion 21, while the latter pinion 35, due to the fact that the ratio of the driving pinion and gear ring 14 are the same, causes the pilot pointer 26 to remain in a predetermined position with respect to the platform 13.

It is apparent therefore that the pilot pointer 26 will disclose the actual number of parts which the circle 28 is revolved as the turntable 17 is rotated, due to the fact that the pointer 26 remains stationary. However, the pointer 27 will move a desired number of decimals of the circle, enabling the operator to instantly determine a fractional part of the division of the graduated circle.

By virtue of the foregoing provisions, such a degree of accuracy is assured that repetition of angles will become unnecessary, not only saving time and labor of computation but likewise eliminating entirely the eye fatigue usually suffered by reading minute graduations on small diameter circles which frequently give rise to error in computation.

Manifestly, the construction as shown and described is capable of some modification and such modification as may be construed to fall within the scope and meaning of the appended claims is also considered to be within the spirit and intent of the invention.

What is claimed is:

1. A direction indicator, including a fixed support and a superimposed rotatable body carrying a graduated circle, a gear ring mounted on said fixed support, a driving gear carried by said rotatable body, a pilot pointer constrained to remain at a predetermined position with respect to said support adapted to indicate the amount revolved on said circle, a complementary pointer arranged to move to indicate a predetermined number of decimals of said circle and gear means intermediate said driving gear and pointers for holding said pilot pointer against movement and for actuating said complementary pointer.

2. A direction indicator, including a stationary support and a movable body superimposed thereon carrying a graduated scale, means in corresponding relation to the graduation of said scale for indicating actual degrees of movement of said body, complementary means movable simultaneously to indicate a predetermined number of parts of said graduations and means effective upon movement of said body for constraining said first means to remain in a predetermined position and for actuating said second means.

3. A direction indicator including a rotatable body carrying a scale and disposed on a stationary mounting, a pointer adapted to indicate on said scale the degree of rotation of said body and a complementary pointer movable with respect to both said mounting and body and means carried by said body and actuated upon movement thereof to constrain said first pointer to remain in a certain position with respect to said stationary mounting and to effect movement of said complementary pointer.

4. An instrument of the character described including a normally stationary support and a rotatable body superimposed thereon bearing a graduated scale, means held in a certain position with respect to said support for measuring the degree of rotation of said body, means movable with respect to both said body and support for measuring divisions of said scale and means effective upon rotation of said body for maintaining predetermined position of said first means and for actuating said division measuring means.

5. A direction indicator including a stationary support and a movable body superimposed thereon having a graduated scale thereon, a pilot pointer and a complementary pointer, means operative by and upon movement of said body for actuating said complementary pointer to predeterminately measure decimal divisions on said scale but effective to hold said pilot pointer in a predetermined position to measure normal divisions on said scale.

6. An instrument of the character set forth in claim 5 in which the means operated upon movement of the body includes a gear ring carried by the support, a gear carried by said body and engageable with said gear ring, and a plurality of interengaging gears whose ratio differential is effective to constrain the pointers of said instrument to indicate on the scale of said body, normal and decimal divisions.

MALCOLM H. THOMPSON.